Figure 1:
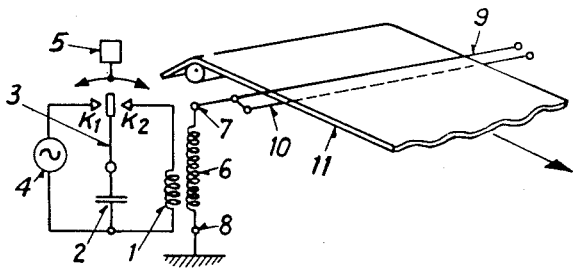

June 26, 1956     F. J. MAAS     2,752,533
APPARATUS FOR THE EDUCTION OF ELECTROSTATIC
CHARGES FROM THE SURFACE OF MATERIALS
OF POOR ELECTRICAL CONDUCTIVITY Filed Jan. 17, 1952     4 Sheets-Sheet 1

INVENTOR:
F. J. Maas
BY
Richardy Geier
ATTORNEYS

June 26, 1956 F. J. MAAS 2,752,533
APPARATUS FOR THE EDUCTION OF ELECTROSTATIC
CHARGES FROM THE SURFACE OF MATERIALS
OF POOR ELECTRICAL CONDUCTIVITY
Filed Jan. 17, 1952 4 Sheets-Sheet 3
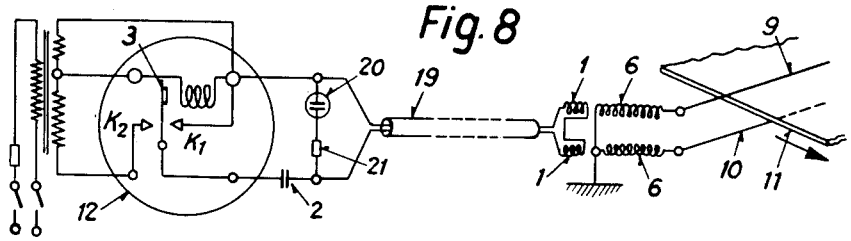
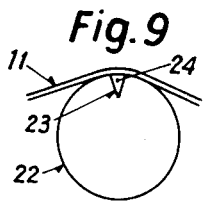 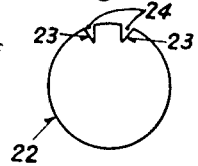 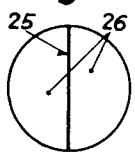 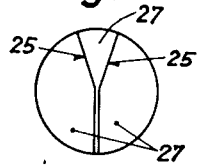
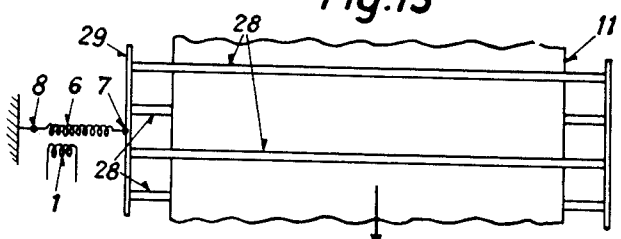
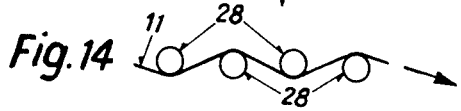
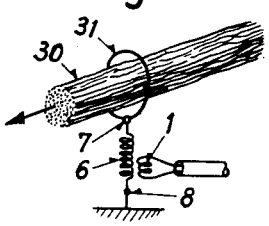 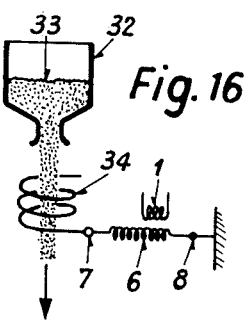 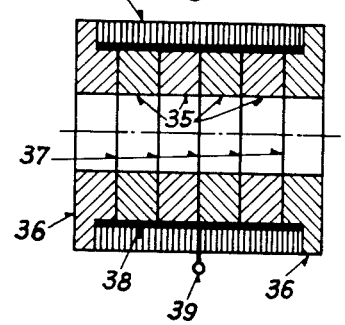
INVENTOR:
F. J. Maas
By
Richard y Geier
ATTORNEYS

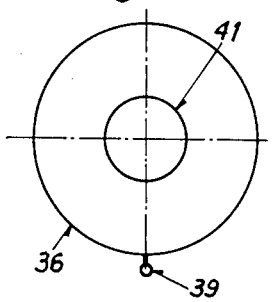
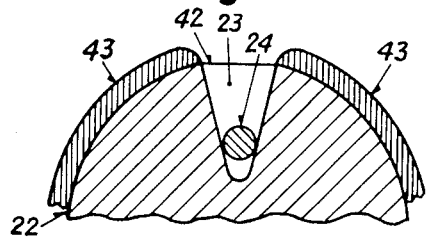
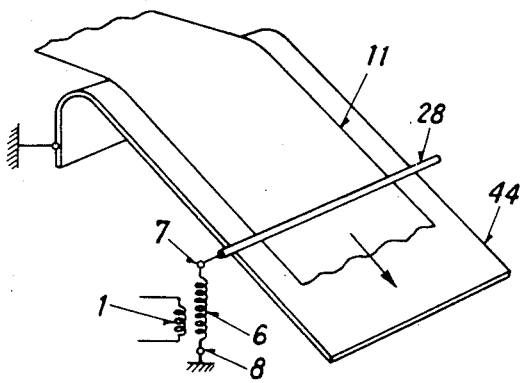
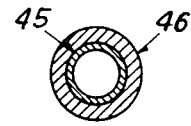
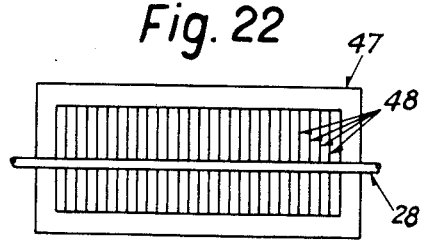
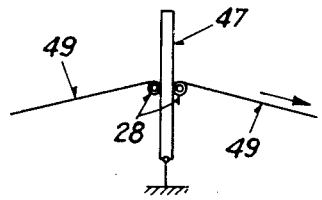

United States Patent Office 2,752,533
Patented June 26, 1956

2,752,533

APPARATUS FOR THE EDUCTION OF ELECTRO-STATIC CHARGES FROM THE SURFACE OF MATERIALS OF POOR ELECTRICAL CONDUCTIVITY

Friedrich Julius Maas, Zurich, Switzerland, assignor to Societe Financiere d'Expansion Commerciale et Industrielle SA. "SFINDEX," Sarnen, Switzerland, a Swiss company Application January 17, 1952, Serial No. 266,913

Claims priority, application Switzerland January 20, 1951

4 Claims. (Cl. 317—2)

The present invention relates to an apparatus for the eduction of electrostatic charges from the surfaces of materials of poor electrical conductivity by means of high-frequency high-tension current produced by capacitor discharges via an oscillatory circuit.

The capacitor is charged during a portion of the period of a low-frequency alternating potential, for which purpose an oscillating armature vibrating in synchronism with the said alternating potential is provided which, periodically and alternately, first connects the capacitor, for a portion of the period, and in proper phase relation, to the source of low-frequency alternating potential, and then discharges it via an oscillatory circuit. The oscillatory circuit consists at least in part of the primary winding of a transformer of high transformation ratio for the damped high-frequency oscillations generated in the oscillatory circuit. The transformer is located at a distance from the oscillatory circuit, is connected to the same only by conductors, and is disposed directly at the metallic electrodes. The electrodes, in turn, are connected to one pole of the secondary winding of the transformer, the other pole of which winding is earthed.

There already exist a number of methods and devices for conducting away electrostatic surface charges by means of a more or less intensive ionization of the atmosphere in the vicinity of the material surfaces to be discharged. In such devices, operating by electrical means, ionization of the air in the vicinity of the material surfaces to be discharged is generally effected by means of a comb-like metallic electrode provided with separate points, to which electrode a high direct-current or alternating-current voltage is connected. The point discharges in the form of "electric breeze" then provoke more or less intensive ionization in the air space between the points of the comb-like electrode and the material surface to be discharged. This method exhibits the drawback, however, of involving danger to the operating personnel in the event of accidental contacts, for which reason it is necessary to make the internal resistance of the source of potential used extremely high in order to diminish this hazard, a measure which greatly impairs the eductive effect of the device. These drawbacks are avoided if the electrodes are fed with high-frequency high-voltage current, but this method has not as yet succeeded in establishing itself in practice because of the relatively high expenditure entailed in the provision of standard high-frequency generators. For this reason the attempt has also been made to use damped high-frequency oscillations, which can be generated by discharge gap generators; whilst in this way it proved possible to reduce the expense, this saving was at the cost of operational safety. Moreover, it was found difficult to feed to the electrodes, without loss, and under conditions of operational safety, the high peak voltages occurring.

Figure 2:
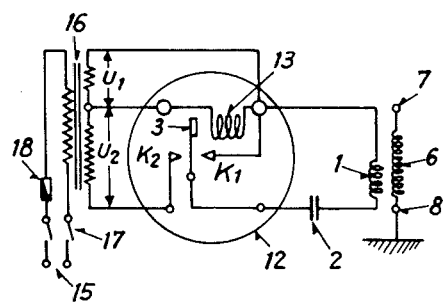
Figure 3:
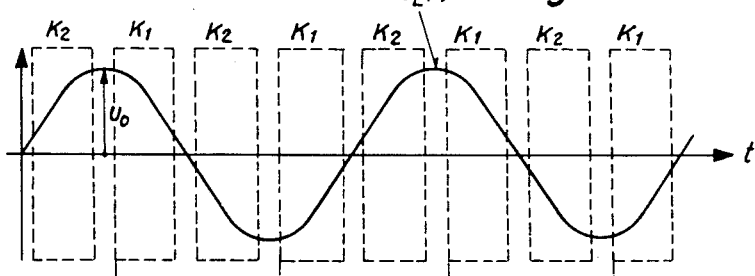
Figure 4:
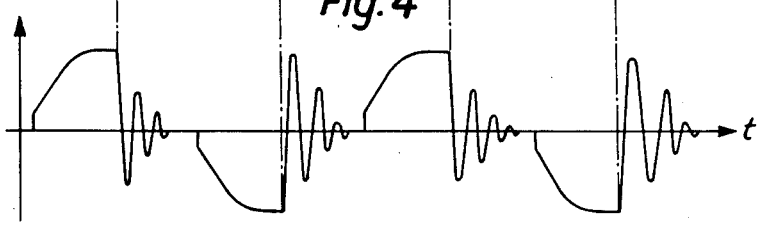
Figure 5:
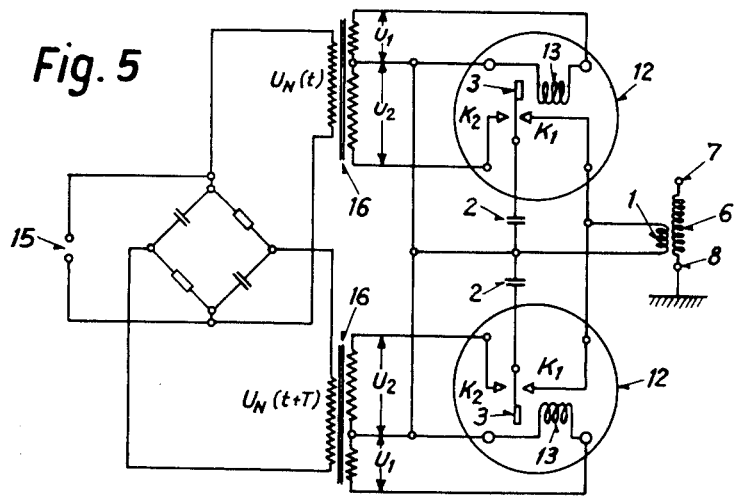
Figure 6:
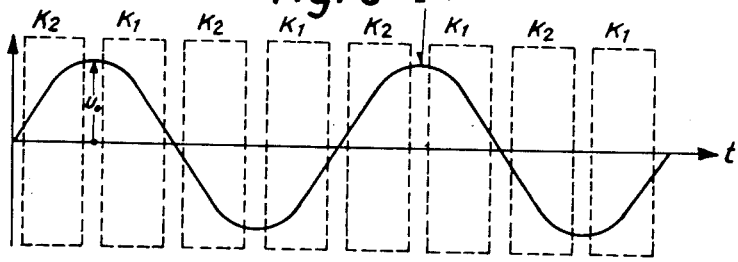
Figure 7:
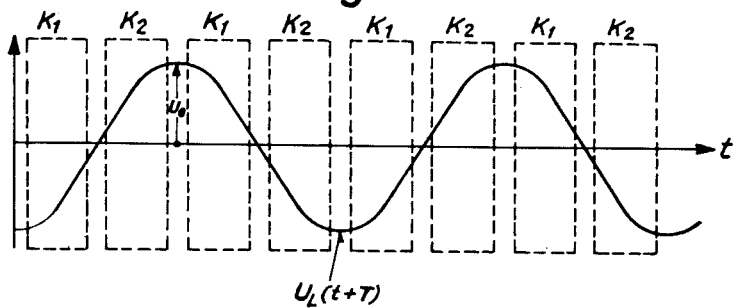

The apparatus in accordance with the present invention likewise operates with damped high-frequency oscillations which are generated by periodic capacitor discharges, but it avoids the drawbacks of the methods and devices of a similar kind hitherto known, notwithstanding the facts that it calls for a notably small amount of apparatus and that it permits of the safe employment of even the highest peak potentials. The apparatus is illustrated in Figs. 1 to 23, which represent the following:

Fig. 1, the principal of the apparatus;

Figs. 2 to 4, a typical embodiment of the high-frequency generator and the timing of partial potentials therein;

Figs. 5 to 7, a further typical embodiment of the high-frequency generator and the timing of some potentials therein;

Fig. 8, a typical embodiment of the apparatus with a spatially divided oscillatory circuit;

Figs. 9 to 14, typical embodiments of electrodes for the discharge of materials occurring in band form;

Figs. 15 to 16, each shows an application of the apparatus to the discharging of specific kinds of materials;

Figs. 17 to 23, further typical embodiments of electrodes.

The principle of the apparatus is shown schematically in Fig. 1. The oscillatory circuit consists in this typical embodiment of the induction coil 1 and the capacitor 2, which is, in periodic sequence, first charged via the contact $K_1$ from the source of current 4, and then discharged via the contact $K_2$ and the induction coil 1, by means of the change-over switch 3. For this purpose, the changeover switch 3 is operated by the controller 5 in such a way that it effects in rapid sequence the phase-correct charging by 4, and then the discharge, of the capacitor 2, each discharge period being made of such length or the oscillatory circuit damping being made so high that the rest potential present in the capacitor 2 on the opening of the contact $K_2$ is very slight. By each capacitor discharge, a damped high-frequency oscillation is provoked in the oscillatory circuit comprising the induction coil 1 and the capacitor 2, and a potential of the same frequency generated in the secondary coil 6, which is closely coupled to the induction coil 1 and has a large number of turns. The turns ratio between the coils 1 and 6 is made such that at the terminal 7 there occurs, over the earthed terminal 9, a high-frequency potential of the order of magnitude of 50,000 to 100,000 volts or more. Connected to the terminal 7 are metallic electrodes, here shown by way of example as two very thin metal wires 9 and 10, between which the material to be discharged, here shown by way of example as 11, moves along. Owing to the potential to earth prevailing in the thin metal wires 9 and 10, and the field strength concentration at the surface of the metal wires, there occurs in the air in the immediate vicinity of the two wires a spontaneous electrical glow discharge. Electrostatic charges which adhere to the surfaces of the band of material 11 provoke an ionic current between the metal wires and the upper or lower face of the band of material 11, fed from the cloud of ionized air molecules in the glow region of the electrode wires 9 and 10. Through this ionic current, the surface charges are conducted away to the electrodes 9 and 10, which are connected in parallel, where they in part cancel one another out or flow away to earth via connecting terminal 7, secondary coil 6 and connecting terminal 8.

A typical embodiment of such a high-frequency generator is shown in the wiring diagram of Fig. 2, in which an ordinary commercial mincer 12 and, as the source of current, an alternating current main connected to the pair of terminals 15, are used. The field coil 13 of the mincer 12 is here excited with the alternating potential $U_1$ from the mains transformer 16 and provokes a periodic oscillation of the spring-type armature 3 at twice the mains frequency as soon as the mains switch 17 is switched on and the primary winding of the mains transformer 16 receives mains voltage via the fuse 18. The capacitor 2 is connected to the voltage $U_L = U_1 + U_2$ via the contact $K_2$ and, after charging, discharged via the contact $K_1$ and the induction coil 1. As the charging voltage $U_L = U_1 + U_2$ is an alternating potential of the form $U_L(t) = U_0 \sin wt$, the charging and discharging of the capacitor 2 must take place in proper phase relation. Fig. 3 shows the timing of $U_L(t)$ and indicates by means of the discontinuous outlines marked $K_1$ and $K_2$ during what time intervals the armature 3 touches the contacts $K_1$ and $K_2$ respectively. In the alternating-current excitation of the mincer field coil 13 here concrened, the armature 3 oscillates with a phase displacement of 90° in relation to the exciting voltage $U_1$, which is in phase with $U_L(t)$. The circuit is therefore so arranged that at the beginning of the time interval marked $K_2$ in Fig. 4 the capacitor of the high-frequency generator (marked 2 in Fig. 2) is connected to the potential $U_L$, which takes place practically without sparking, as the potential $U_L$ is at this moment still very small. The capacitor is then charged, during the contact period $K_2$, almost to the peak potential $U_0$, and the contact $K_2$ opens again at a moment when the charging current to the capacitor is small, i. e., no break spark can occur. During the closing time of $K_1$ the capacitor is discharged via the induction coil (marked 1 in Fig. 2) and causes an oscillating current in the oscillatory circuit, the damping of which is such that the oscillating amplitude has declined to a small value within the contact closing time $K_1$, so that when contact K is opened no break spark occurs. The charging and discharging cycle of the capacitor is schematically shown in Fig. 4 as a function of the time $t$.

In the typical circuit to Fig. 2 the oscillatory circuit is excited only during the contact closing time $K_1$, i. e., during less than 50% of each complete alternating potential cycle. By using a push-pull circuit with a further completely similar mincer 12, it is possible with the typical circuit shown in Fig. 5 to achieve the result that the oscillatory circuit is excited for twice the length of time. For this purpose a second capacitor 2 of the same capacitance is necessary in addition to the one shown in Fig. 2, and a second transformer 16 of the same type. The primary windings of the transformers 16 are not connected in parallel to the alternating voltage terminals 15, however, but to the opposite corners of a so-called 90° phase bridge of known type or to another 90° phase shift member, in such a way that the primary potentials of the two transformers 16, whilst of the same magnitude, are 90° out of phase with one another. The timing of the charging voltage $U_L(t)$ and the contact times of one half of the circuit are shown in Fig. 6, and the corresponding magnitudes of the other half of the circuit in Fig. 7. Since the two mincers 12 now operate with a phase discrepancy of 90°, the charging period of the one capacitor 2 coincides in respect of time with the discharge period of the other capacitor 2, and the induction coil 1 forms alternately, with one or other of the capacitors 2, an oscillatory circuit which is excited to damped oscillations by the successive capacitor discharges.

In the practical application of the apparatus for the eduction of electrostatic charges in accordance with the present invention, it is often desirable to dispose the high-frequency generator at some distance from the electrodes. In such cases the high-frequency generator is divided into two spatially separated structural units or groups, as shown in Fig. 8 is a typical embodiment. The induction coil 1, which here consists of two halves, forms, with the insulated double lead 19 and the capacitor 2, the oscillatory circuit, as soon as the changeover switch 3 is set at contact $K_1$. The lead 19 may be several yards long, since it acts as a double-wound lead and makes no contribution to the induction coil 1, but merely maintains the capacitance of the oscillatory circuit. In the high-frequency generator proper there is also a glim lamp 20, in series with a resistor 21 parallel to lead 19, for the purpose of indicating the high-frequency potential during operation or in the event of any short-circuits occurring in the lead 19. In the present typical embodiment, each of the two induction coils 1 is combined with the corresponding secondary coil 6 to form a high-frequency transformer, and assembled directly with the electrode 9 or 10, with the result that the necessity is avoided of providing a supply lead for the high-frequency high potential to the electrodes.

The apparatus for the eduction of electrostatic charges from the surfaces of materials of poor electrical conductivity in accordance with the present invention possesses electrodes which, at least at those parts of said electrodes which lies immediately opposite the material surfaces to be discharged, are so shaped as to bring about a substantial concentration of field strength at these points. With the high-frequency high potential which is connected to the electrodes, there occurs at these points, in the surrounding air and in at least a portion of the air space between each electrode and the material surfaces to be discharged, a spontaneous glow discharge. In Figs. 9 to 20, various typical embodiments of such electrodes are schematically represented.

For the discharge of electrostatic charges from material of band form, Fig. 9 shows a suitable electrode in cross-section; it consists of a round rod 22 of insulating material the surface of which is ground smooth, and polished. The round insulating rod is provided throughout its length with a V-section groove 23 in which is located a very thin metal wire 24 which is connected to the non-earthed high tension terminal of the secondary coil of the high-frequency transformer. The band of material 11 the lower surface of which is to be discharged slides over the insulating rod 22 and the longitudinal groove 23 without touching the metal wire 24. Owing to the glow discharge prevailing in the air gap between the band of material 11 and the wire 24 in the immediate vicinity of the surface thereof there arises an intense ionic cloud in the region of the glow discharge which renders possible the building up of an ionic current between the charges adhering to the under face of the band on the one hand and the metal wire 24 on the other.

For conducting away very powerful surface charges an insulating rod 22 as shown in Fig. 10, with two or more longitudinal grooves 23 each containing a thin metal wire 24, is used. In such electrodes the material surface to be discharged may also move past the insulating bars at a greater distance above the latter, and need not necessarily slide over and in contact with the insulating bars.

Fig. 11 shows in cross-section a form of electrode in which a very thin metal foil 25 is positioned between two half-round rods 26 of insulating material. When the two half-round rods and the metallic foil have been joined together, the round rod so formed is ground and polished on its surface so that the foil appears on the surface of the rod like a very slender metallic insert. The metallic foil is connected to the high-frequency high potential, with the result that in the vicinity of each of the metal edges embedded in the surface a spontaneous glow discharge of the air occurs. By joining together three rod-shaped insulating bars 27, Fig. 12, with a thin metal foil 25 at each of the contact surfaces, there is similarly formed a round rod of insulating material with a plurality (here three) of metal inserts along its surface. The material surfaces to be discharged move along over these electrodes, either in contact with the said electrodes or a short distance away from them.

The simultaneous discharge of the upper and lower faces of materials of band form with electrodes of the types shown by way of example in Figs. 9 to 12 is diagrammatically illustrated in plan in Fig. 13 and in cross-section in Fig. 14. The band of material 11 travels in the direction of the arrow through an apparatus having a plurality, here four, of electrodes taking the form of round rods 28, two of which sweep the upper and two the lower face of the band of material. The round rods 28 consist of insulating material and each has one or a plurality of metal inserts along its surface, in accordance with the typical embodiment shown in Figs. 9 to 12. All the metal inserts are conductingly interconnected by a metal bar 29 and are connected to the connecting terminal 7, which carries high-frequency high-tension current, of the secondary coil 6 of the high-frequency transformer. The separate electrodes 28 are so disposed that at least one metal insert is located on that part of the surface of the insulating rods 28 which is touched by the band of material 11, in the vicinity of which metal insert the atmosphere exhibits a spontaneous glow discharge.

The forms of electrodes shown by way of example in Figs. 9 to 12 and built up of round rods of insulating material are expediently provided at one end with an axial bore of sufficient diameter and length, into which the high-frequency transformer, consisting of one cylindrical primary and one cylindrical secondary winding, is so inserted that, inside the round rod, it makes contact through its high-potential terminal with the metallic electrodes incorporated in the rod. The rear end of the high-frequency transformer then possesses only the earthed secondary connection and the primary connections carrying low tension only.

The application of the apparatus to the eduction of electrostatic charges from the surfaces of separate filaments or a plurality of filaments combined into a bundle, said filaments being made of materials of poor electrical conductivity, is shown in principle, in the form of a typical embodiment, in Fig. 15. The bundle 30 to be discharged moves in the direction of the arrow past an electrode which is here indicated by way of example as taking the form of a thin metallic wire ring 31. The wire ring 31 is connected to the connecting terminal 7 of the secondary coil 6 of the high-frequency transformer, the other terminal 8 of which coil is earthed. The high-frequency potential prevailing between terminals 7 and 8 is of such magnitude that as a result of the concentration of field strength in the immediate vicinity of the surface of the wire a spontaneous atmospheric glow discharge takes place around the wire ring 31. The electrostatic charges adhering to the surfaces of the bundled material provoke an ionic current between the travelling bundle 30 and the electrode 31, which current occupies the entire interior space of the plane of the wire ring and conducts away to earth, via the wire ring 31 and the low direct-current internal resistance of the secondary coil 6, the electrostatic surface charges of the material 30. In order to enhance the eductive effect, a plurality of similar annular electrodes can be arranged in succession along the travelling bundle of material, all of which are interconnected and connected to the terminal 7 of the secondary coil of the high-frequency transformer.

For the eduction of electrostatic surface charges from fine or coarse-grained materials, Fig. 16 shows the principle of application of the apparatus in a typical embodiment. The powder 33, flowing in a thin stream from the supply container 32, falls in the direction of the arrow through the space enclosed by an electrode 34, here shown by way of example as taking the form of a very thin metal wire. This metal spiral or coil 34 is connected to the terminal 7 of the secondary coil 6 of the high-frequency transformer, whose terminal 8 is earthed. The high-frequency alternating potential generated between the terminals 7 and 8 by the high-frequency generator provokes, owing to the concentration of field strength at the surface of the very thin metal wire of the spiral 34, a spontaneous atmospheric glow discharge in the immediate vicinity of said spiral 34. Any electrostatic surface charges which may be present in the particles of material passing through the space contained by the spiral 34 generate an ionic current fed from the ionic cloud in the glow discharge, which ionic current causes eduction of the said surface charges to the metal spiral 34 and thence through the low direct-current internal resistance of the secondary coil 6 to earth.

Fig. 17 shows in longitudinal section, and Fig. 18 in front elevation, an electrode, in the form of a typical embodiment, suitable for the applications in accordance with Figs. 15 and 16. The entire tubular electrode, made of insulating material, is composed of a number, here four, of flat insulating rings 35 which abut one another and exhibit, between one another and the two insulating cover rings 36, sheets of very thin metal foil 37. The insulating rings 35 are held together by a metal tube 38 which at the same time provides the conducting connection between all the metal foils 37 and is provided with a connecting terminal 39. An insulating shell 40 closes off the metal tube 38 from the exterior. When the electrode has been assembled, the inside of the bore 41 is ground and polished, so that the metal foils 37 appear on the wall of the bore only as very thin metal inserts. If the terminal 39 is connected to the high-frequency high tension of the connecting terminal 7 of the high-frequency transformer, the field strength concentration at the metal edges on the wall of the bore 41 causes spontaneous glow discharges in the air in the immediate vicinity of the metal edges.

Another embodiment of a similar electrode uses an insulating tube on whose smooth inner wall a very thin metal wire is axially arranged in the form of a wide-pitched, multiple-turn spiral and is cemented to said wall, said metal wire being connected to the high-potential terminal 7 of the high-frequency transformer.

All the electrodes described in Figs. 9 to 18 provoke a spontaneous glow discharge in the immediate vicinity of those metal parts at which there is, owing to their shape, a concentration of field strength. This glow phenomenon is indispensable as the source of the necessary strong ionization of the air for the present purpose, but for certain applications of the apparatus for the eduction of electrostatic surface charges it may entail serious drawbacks. This is particularly the case with applications in rooms or in connection with materials which exhibit combustible gases, vapours, etc., or where the occasional formation of such is possible. In order to diminish or entirely eliminate the danger of explosion in such cases, suitable precautions may be taken in respect of all the types of electrodes described in the foregoing. Fig. 19 shows diagrammatically and on an enlarged scale, the precaution taken with an electrode of the type shown in Fig. 9. Here again the round bar of insulating material is assigned the numeral 22, the V-section longitudinal groove the numeral 25, and the very thin metal wire inserted therein the numeral 24. In order to prevent ignition, by the atmospheric glow discharge prevailing in the immediate vicinity of the surface of the wire, of any explosive gases which may occur in the vicinity of the electrode, the V-section groove 23 is covered throughout its length with a fine-mesh fabric 42 made of electrically nonconducting, and non-combustible, material. This cover is secured, for example, by a tube 43 of insulating material which is slipped on to the round insulating rod 22 and is secured thereupon together with the fabric 42. The fine-mesh fabric affords practically no obstacle to the occurrence of an ionic stream to the surface, to be discharged, of the material passing above the longitudinal groove. On the other hand it does, with certainty, prevent the ignition, by the glow phenomena occurring within the V-shaped groove covered in the manner described, of any explosive gases or vapours which may be present in the exterior atmosphere. In a similar manner to what is shown in Fig. 19, such a precaution can also be taken in respect of all the other forms of electrode.

For those applications of the apparatus for the eduction of electrostatic charges in which, as shown diagrammatically by way of example in Fig. 20, the band of material 11 to be discharged slides over a metal surface 44 with one face in contact therewith, it is advisable to use another type of the electrodes 28, as shown in cross-section in Fig. 21. A metallic coating 45, to which the high-frequency high tension is connected, is disposed within the insulating tube 46. The tube 46 consists of an insulating material of highest possible dielectric constant, with the lowest possible loss characteristics in the frequency range used, and still sufficiently puncture-proof for the high tension supplied to the metallic coating 45. If the electrode constructed in this way is arranged, as indicated in Fig. 20, transversely over the metal slideway 44, which is connected to earth, at a slight distance from said slideway, the field strength potential caused by the differences of dielectric constant between the tube 46 and the exterior atmosphere provokes at the surface of the tube a glow discharge which occupies the entire space between the electrode 28 and the metal slideway 44, without any sparking-over occurring. The web of material 11 sliding on the metal surface 44 passes, as it travels in the direction of the arrow, through the said region of glow discharge and therefore through a region of intense ionization of the air, with the result that an ionic current between the web of material 11 and the metal support 44 is built up which brings about the discharge of static from the web of material 11.

The typical embodiment of an electrode insulated on all sides, shown in Fig. 21, is also suitable for the use of the apparatus for the elimination of static charges from filamentous materials having poor electrical conductivity properties when said materials pass through metal combs, as for instance in the warping machines used in the textile industry. Fig. 22 shows such a comb diagrammatically in front elevation, and Fig. 23 in lateral elevation, said comb consisting of the frame 47 in which the metal prongs 48 are embedded. A filament or thread 49 (not shown in Fig. 22) passes through each intermediate space between the said prongs, in which process it slides over the electrodes 28 arranged transversally to the comb. The said electrodes 28 are constructed and connected in the same way as described in connection with Figs. 20 and 21, but are provided with a tube 46 of smooth, polished material, preferably glass or porcelain. Owing to the glow discharge occurring in the space between the electrodes 28 and the separate metal prongs 48, there occurs a region of powerful ionization of the air, whereby the eduction of electrostatic charges adhering to the separate threads 49 is encompassed.

What I claim is:

1. An apparatus for the eduction of electrostatic charges from a material, said apparatus comprising in combination with a high frequency high potential generator; at least one round insulator rod adapted to engage said material, said rod having formed therein at least one longitudinal groove extending in the direction of the rod, a thin electrode disposed in said groove and having a smooth outer surface, and means operatively connecting said electrode with said generator, whereby a silent glow discharge is formed along that surface of the electrode which faces the material as soon as sufficiently high potential is supplied to the electrode.

2. An apparatus for the eduction of electrostatic charges from a material, said apparatus comprising in combination with a high frequency high potential transformer having a secondary winding, at least one round insulator rod, said rod consisting of a plurality of bars having inner surfaces, and a conducting metal foil upon said inner surfaces and covering said inner surfaces throughout their length and breadth, said bars being joined together to form said round rod, said metal foil having smooth edges upon outer surfaces of said rod, and means operatively connecting said foil with said secondary winding, whereby a silent glow discharge is formed along said edges of the foil as soon as sufficiently high potential is supplied to the foil.

3. An apparatus for the eduction of electrostatic charges from a material, said apparatus comprising in combination with a high frequency high potential generator; a plurality of round insulator rods adapted to engage opposite surfaces of a band of said material, each of said rods having formed therein at least one longitudinal groove extending in the direction of the rod, a thin electrode disposed in said groove and having a smooth outer surface; and means interconnecting the electrodes of said rods and connecting them to said generator.

4. An apparatus for the eduction of electrostatic charges from a material, said apparatus comprising in combination with a high frequency high potential generator; at least one round insulator rod having formed therein at least one longitudinal groove extending in the direction of the rod, a thin electrode disposed in said groove and having a smooth outer surface, a fine-mesh fabric of non-combustible and electrically non-conductive material between the electrode and the surface of the material to be discharged, and means operatively connecting said electrode with said generator.

References Cited in the file of this patent

UNITED STATES PATENTS

| 777,598 | Chapman | Dec. 13, 1904 |
| 1,262,173 | Chapman | April 9, 1918 |
| 1,680,310 | Wehrle | Aug. 14, 1928 |
| 1,900,543 | Cochrane | Mar. 7, 1933 |
| 1,968,861 | Strong | Aug. 7, 1934 |
| 2,493,662 | Fitspatrick | Jan. 3, 1950 |
| 2,524,163 | Criss | Oct. 3, 1950 |

FOREIGN PATENTS

| 66,087 | Denmark | Dec. 22, 1947 |
| 505,566 | Great Britain | May 11, 1939 |

OTHER REFERENCES

Electric Transients, by Magnusson, Kalin and Tolmie. Chapter 5, pages 75 to 100—specifically the figures on pages 80 and 81. Published by McGraw-Hill Book Company, New York, 1922.